United States Patent [19]
Holmberg

[11] Patent Number: 5,269,945
[45] Date of Patent: Dec. 14, 1993

[54] METHOD AND A DEVICE FOR THE SEPARATION OF BODIES FROM A LIQUID

[76] Inventor: Glenn Holmberg, Elitgatan 2, S-282 00 Tyringe, Sweden

[21] Appl. No.: 961,016

[22] Filed: Oct. 14, 1992

Related U.S. Application Data

[63] Continuation of Ser. No. 613,563, Nov. 28, 1990, abandoned.

[30] Foreign Application Priority Data

Jun. 1, 1988 [SE]  Sweden ............................. 8802034

[51] Int. Cl.⁵ ............................................ B01D 33/44
[52] U.S. Cl. ............................. 210/744; 210/158; 210/350; 210/386; 210/402; 210/486; 210/769
[58] Field of Search .................... 100/37, 123, 130; 210/86, 107, 105, 138, 232, 331, 332, 350, 386, 404, 486, 739, 744, 770, 769, 780, 784, 104, 158, 161, 402

[56] References Cited

U.S. PATENT DOCUMENTS

| | | | |
|---|---|---|---|
| 1,812,736 | 6/1931 | Butler | 210/158 |
| 1,812,736 | 6/1931 | Butler | 210/401 |
| 1,816,132 | 7/1931 | Strindlund | 210/404 |
| 3,774,760 | 11/1973 | Beristain et al. | 210/770 |
| 4,056,473 | 11/1977 | Nilsson | 210/331 |
| 4,092,247 | 5/1978 | Madsen | 210/770 |
| 4,310,424 | 1/1982 | Fremont et al. | 210/386 |
| 4,648,970 | 3/1987 | Hermansson | 210/486 |
| 4,902,410 | 2/1990 | Botsch | 210/104 |

FOREIGN PATENT DOCUMENTS 1598255 9/1981 United Kingdom ............... 210/402

Primary Examiner—Joseph W. Drodge
Attorney, Agent, or Firm—Ladas & Parry

[57] ABSTRACT

A method and apparatus for separating contaminating substances from a liquid containing contaminating substances in which the liquid is passed through a filter of resilient, porous filter material. The contaminating substances are separated from the liquid in the filter whereafter the filter is displaced to a position out of the liquid flow. In this displaced position, the filter material is compressed to squeeze out liquid retained in the filter together with separated substances retained in the filter by opposed frustoconical rollers. After the compression has ceased, the filter is moved to a position where the liquid once again passes through the filter material for renewed separation and accumulation of contaminating substances in the liquid.

16 Claims, 5 Drawing Sheets

METHOD AND A DEVICE FOR THE SEPARATION OF BODIES FROM A LIQUID

This is a continuation of copending application(s) Ser. No. 07/613,563 filed on Nov. 28, 1990, now abandoned and International Application PCT/SE89/00303 filed on May 31, 1989.

FIELD OF THE INVENTION

The present invention relates to a method and a device for the separation of solid bodies, semisolid bodies and/or viscous substances from a liquid.

BACKGROUND

The separation of solid bodies, semisolid bodies and/or viscous substances such as oils from liquids is necessary and difficult in many respects. Particularly awkward conditions prevail when the size and/or consistency of the contaminations vary within wide limits. Also when particles of a small size, e.g. dimensions of less than 100 $\mu$m are included in, or constitute, the contaminations the problems of achieving an effective filtration are great, for example the maintaining of a high capacity of the filters. According to the technique used hitherto filters comprising fine mesh filter elements or edge filters are used, the mesh sizes or apertures being adapted to the sizes of the contaminants present. It is well known to those versed in the art that such filters have to be frequently cleaned and exchanged, since the filter openings easily become clogged especially when the contaminated liquid includes bodies in a semi-solid state which are easily deformed and stick firmly to the filter medium. Such bodies as a rule occur in all types of waste liquors and may be constituted of organic substances which are in an advanced state of putrefaction and largely shapeless. Also substances such as oils bring about problems of the type referred to here.

In accordance with a technique applied up to now a combination of backwashing and brushing or scraping of the filter surface is used for the cleaning of a filter. Backwashing implies substantial losses, since pure or already purified liquid has to be used for the purpose, as a result of which the amount of purified liquid and hence the capacity of the filter are reduced to a considerable extent. As a consequence thereof the cost of the purification process is increased. Moreover, under certain circumstances, heat has to be supplied in order to make the purification sufficiently effective. Thus, for example, in the case of strongly adhering substances, heated liquid often is used. This naturally gives rise to undesirable additional costs for the heating of the liquid. Finally, on separating, for example, oils it is particularly difficult to clean a filter, especially if the mesh size is small. In certain applications it is not possible to clean the filters, but they have to be replaced when due to clogging, the flow area of the filter has been reduced to a predetermined value.

SUMMARY OF THE INVENTION

The present invention seeks a method and a device where the need for backwashing the filter is eliminated and where the filter only has to be is becoming clogged. As a result, a particularly high efficiency of the filter is obtained. Likewise in accordance with the invention the need for brushing or scraping of the filter element is eliminated, which means that the filter does not have to be taken out of operation for its cleaning. The invention also makes possible a simple adaptation of the size of the filter openings and the capacity of the filter to existing needs.

By including in the filter element a resilient porous filter material provided with numerous passages (pores) through which the liquid passes, the bodies and/or substances which accompany the liquid are accumulated in the filter material. The passages as a rule are of very small dimensions, frequently less than 100 $\mu$m. On compressing the filter material, bodies and/or substances retained in the filter material are removed by squeezing the liquid which is present in the filter material out of the cavities of the material and thereby the liquid takes along with it any bodies and/or substances separated by the filter material. A backwashing of the filter material is not required, and further the amount of liquid which is squeezed out of the filter material on its compression is extraordinarily small in relation to the quantity of liquid which passes through the filter element. Practical tests have shown that the quantity of squeezed out liquid as a rule largely corresponds to the liquid volume which is required for the transport, without any problem, of the bodies and/or substances removed through a duct to a collecting tank.

In a preferred embodiment of the invention the filter element constitutes a disc which comprises the filter material. The disc has a mainly circular outer edge boundary, and is arranged so that it can rotate about a center axis. The edge boundary connects mainly sealingly to an inner boundary of the channel.

In another preferred embodiment the filter material constitutes, or is included in, a circumferential boundary of a drum which is rotatable about its axis. The contaminated liquid passes through the boundary, the liquid in certain embodiments passing through the boundary in the direction towards the interior of the drum and in other embodiments in the direction from the interior of the drum.

BRIEF DESCRIPTION OF THE DRAWING

The invention will be described below in more detail in connection with a number of figures of the drawing, wherein.

DETAILED DESCRIPTION OF PREFERRED EMBODIMENT

Figure 1:
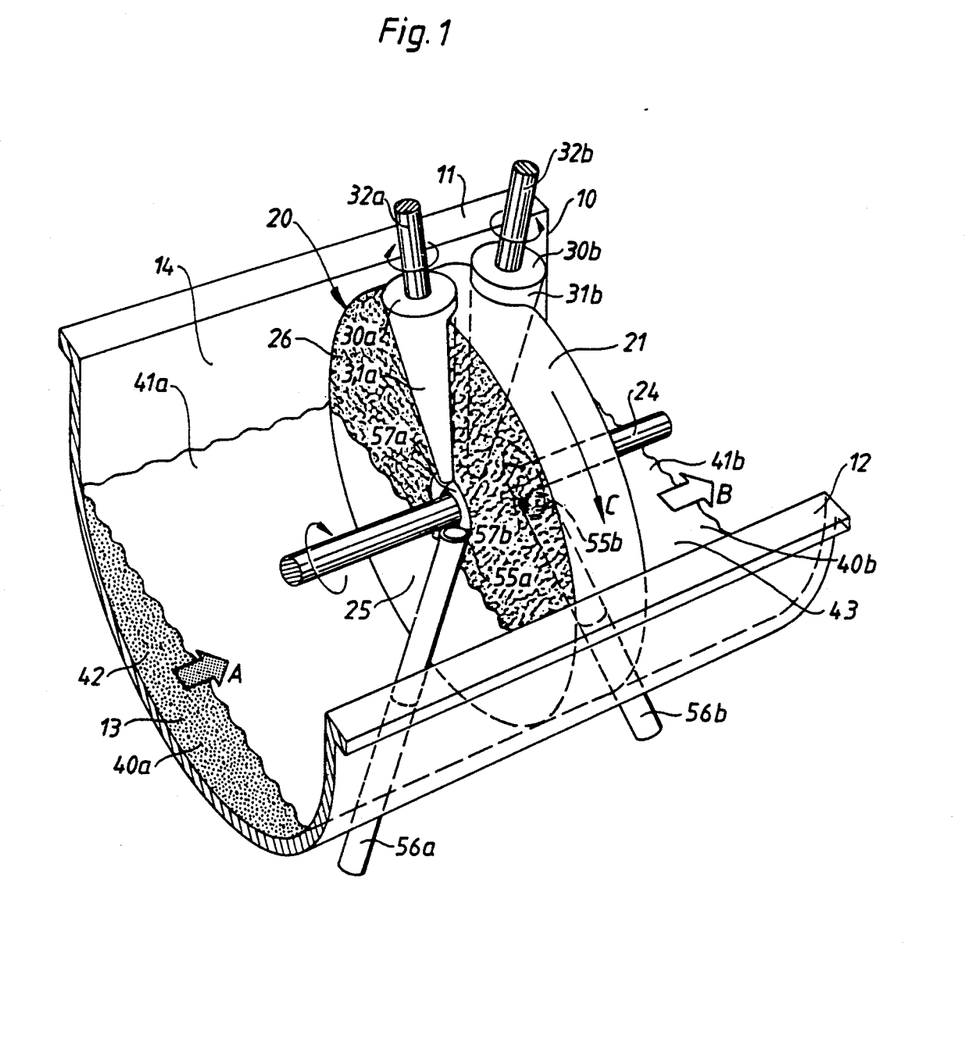
FIG. 1 is a schematic perspective view of a first embodiment of a device in accordance with the invention placed in a channel.

In FIG. 1 there is shown an embodiment of a filter element 20 arranged in an open channel 10, whose bottom part has a substantially circular cross-section. To facilitate the understanding of the figure the walls of the channel are shown in an embodiment wherein they are transparent. It is obvious though that as a rule the boundary of the channel will be made of non-transparent material, e.g. sheet-metal. The channel has on each side an upper boundary edge 11 and 12 respectively, each passing over into the inner boundary surface 14 of the channel. The central bottom region of the channel has the reference numeral 13.

The filter element 20 has a substantially circular outer edge boundary 21 of a shape adapted to the shape of the inner boundary 14 of the channel. The edge boundary of the filter element is sealing connected to the inner boundary of the channel. The filter element comprises an elastic, resilient porous filter material 26 provided with passages (pores), the material being of such a composition and structure that it is permeable to the actual liquid (40a, 40b) whereas solid and/or semisolid bodies together with semiliquid or liquid substances of a viscosity higher than the liquid 42, e.g. contaminations, such as oil, which accompany the liquid, stick to, and/or penetrate into the filter material. The filter element is mounted on a shaft 24 so that it can rotate about its center. The part of the filter element which is traversed by the liquid 40, i.e. mainly that part of the filter element which is below the liquid surface 41a upstream of the filter element, has the reference numeral 25.

In the embodiment shown, two pressure means in the form of pressure rollers 30a, 30b are provided on opposite sides of the filter element and extend substantially along the total radial extension of the filter material. The outer boundary surfaces 31a, 31b of the pressure rollers in the embodiment shown in the figure from truncated cones with their smallest circumference closest to the center of the filter element. The circumference of the cones in each part of the respective cone is adapted to the distance from the center of the filter element, so as to adapt the speed of each part of the boundary surface of the cone to the speed of the filter material when the filter element rotates about its center. The arrow C indicates a preferred direction of rotation of the filter element. The pressure rollers each has an orientation causing the longitudinal shafts 32a, 32b of the respective pressure rollers to be directed towards the region of the center shaft 24. Furthermore the orientation of the longitudinal axes just mentioned is chosen so that the pressure rollers between themselves form a gap of substantially constant gap width.

In certain applications the filter material has a thickness increasing or diminishing in the radial direction of the filter element. The gap width then will be varied in accordance with the thickness of the material, so that as a rule a substantially consistent compression of the filter material is obtained as it passes between the rollers is.

Figure 2:
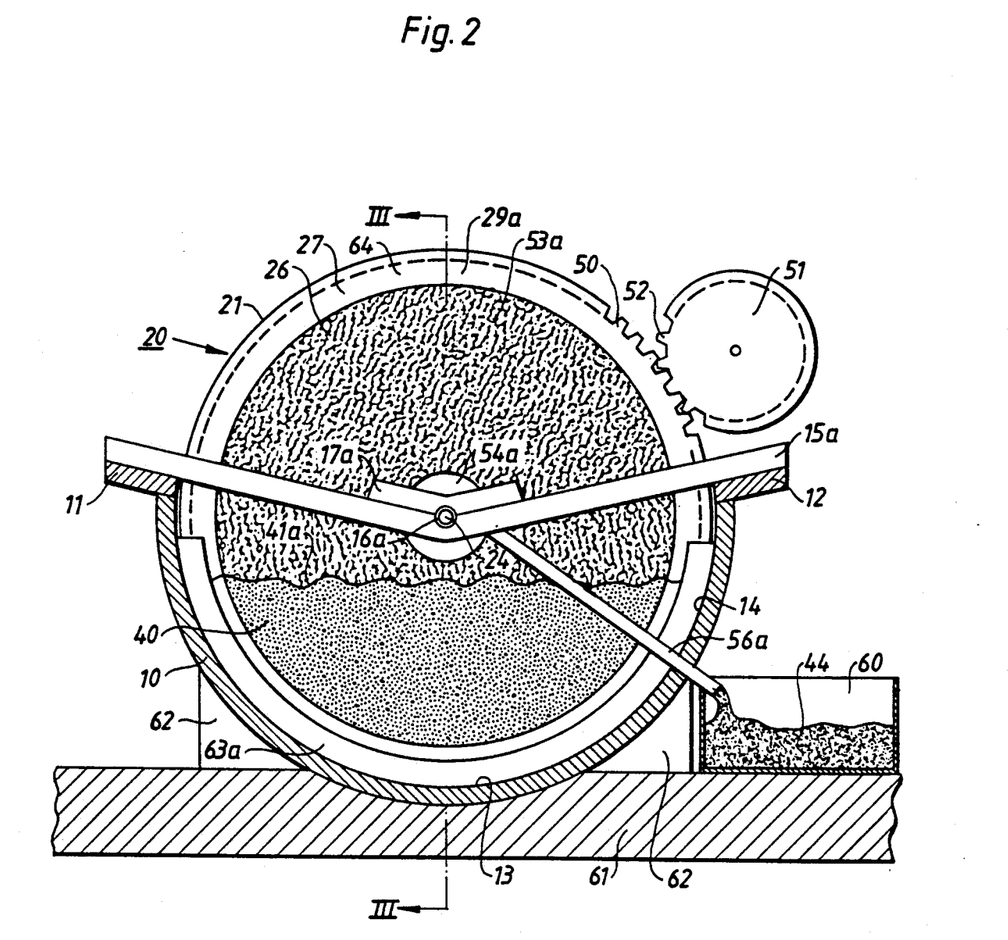
FIG. 2 is a transverse cross-sectional view of the channel with the filter element seen from a position upstream of it the section.

Adjoining the center region of the filter element in the embodiment shown in FIG. 1, collecting means 55a, 55b are provided which via ducts 56a, 56b connect to a collecting tank 60 (see FIG. 2). The collecting means are situated below the pressure rollers 30a, 30b. Circumferentially extending draining and conducting means 57a, 57b are provided in the embodiment shown to receive squeezed out bodies and/or substances as well as liquids and are situated in regions between the lower part of the respective pressure roller and the collecting means 55a, 55b. In certain applications the draining and conducting means are omitted the collecting means being provided as a rule directly below the pressure rollers.

In FIG. 1 is also indicated how the liquid 40a, 40b passes through the channel in the direction of the arrows A and B. The liquid which is located upstream of the filter element is constituted of contaminated liquid 40a whilst the liquid which is located downstream of the filter element is constituted of purified liquid 40b. The reference numerals 41a and 41b refer to the liquid surface of the liquid upstream and downstream respectively of the filter element, and reference numeral 43 refers to the liquid flow through the channel and thus also the liquid flow through the filter element 20. The level difference between the liquid surface 41a upstream of the filter element and the liquid surface 41b downstream of the filter element causes a pressure difference between the outer boundary surfaces of the filter material. The pressure difference means that liquid is pressed through the filter material and the liquid flow 43 persists as long as the filter element allows liquid to pass through.

Figure 3:
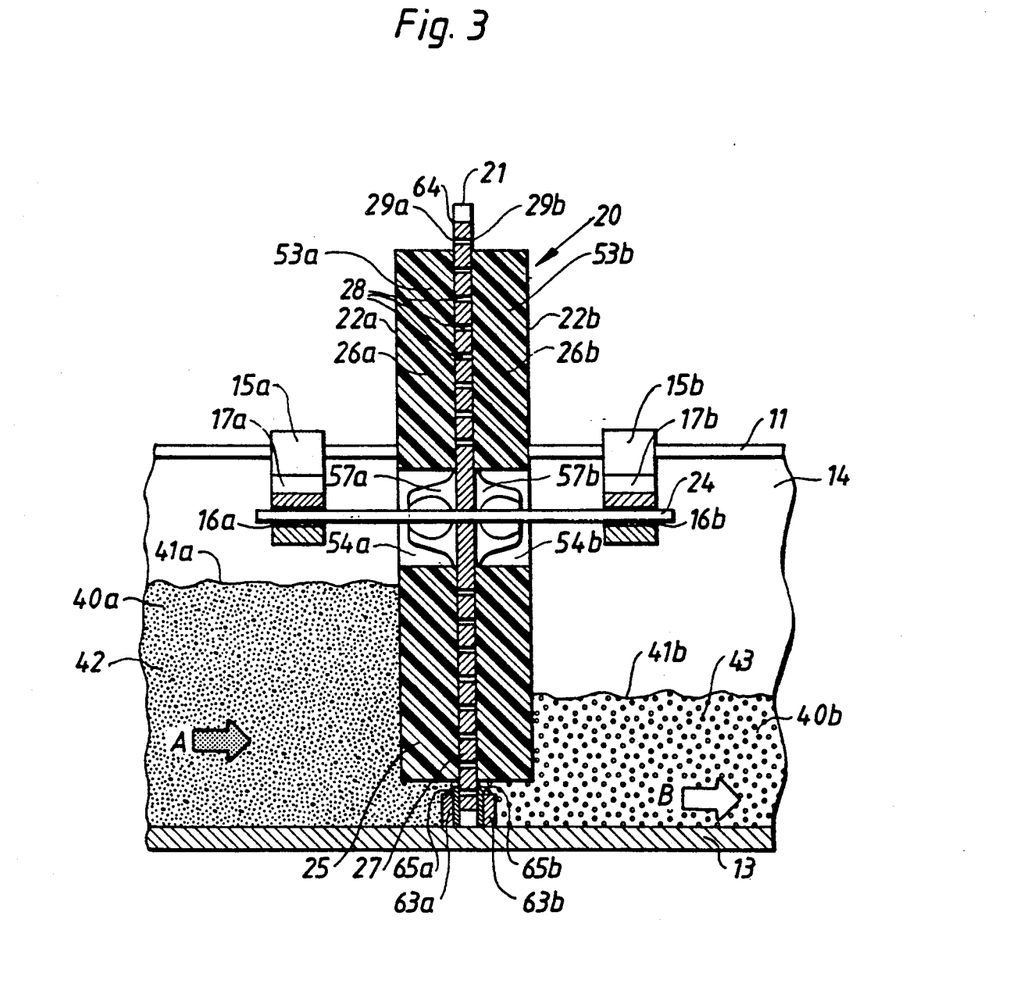
FIG. 3 is a sectional view taken on line III—III in FIG. 2.
Figure 4:
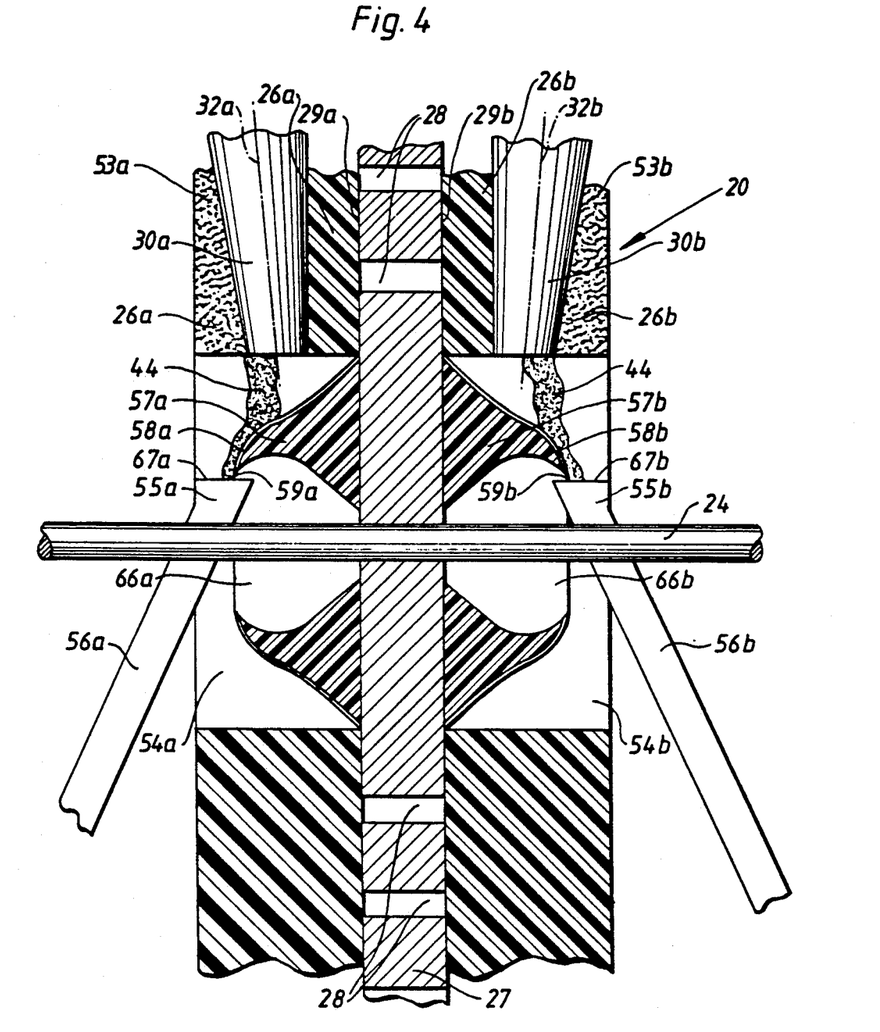
FIG. 4 shows the central region of the apparatus in FIG. 3 on enlarge scale and FIG. 5 is a cross-sectional view of a second embodiment of a device in accordance with the invention.

In FIGS. 2-4 is shown an embodiment of the invention where the filter element 20 comprises a substantially mechanically stable plate 27 which on either side is surrounded by a disc 53a, 53b of the filter material. Each one of the two discs has a central throughhole 54a, 54b. The opposite outer boundary surfaces of the filter element have the reference numerals 22a and 22b respectively and are formed in the embodiment shown by the boundary surfaces of the discs of filter material facing away from the plate 27.

The plate 27 is provided with numerous passages 28 for allowing the liquid to pass through the plate. The number of passages and their size are adapted to the filter material used and the magnitude of the liquid flow. The passages are distributed within the region covered by the discs 53a, 53b. In certain embodiments the discs of filter material are glued to opposite sides 29a, 29b of the plate whereas in other embodiments they are, for example, mechanically attached. This latter embodiment is chosen primarily for applications where the ready exchange of discs appears desirable, for example, to be able to adapt the filter material and the thickness of the discs to the type and extent of contaminations in the liquid which on the particular occasion has to be purified. In the figures the plate is shown in an embodiment where its outer edge boundary 21 is provided with teeth 50 enabling it to cooperate with teeth 52 on a driving means 51. Sealing strips 63a, 63b are provided along the inner boundary 14 of the channel and in the embodiment shown they are arranged so that the plate in an edge region 64 which projects beyond the discs 53a, 53b of filter material is surrounded by the sealing strips when the edge region passes along the inner boundary of the channel. In those cases where extremely good sealing between the edge region 64 and the sealing strips is desired, packings 65a, 65b of sealing material adjoin the latter, and are in contact with the edge region 64 of the plate when the same passes between the sealing strips.

Upstream and downstream of the filter element 20 brackets 15a, 15b are arranged, each of which is provided with a bearing 16a, 16b for the centre axis 24 of the filter element. A locking means 17a, 17b ensures that the center shaft, and with it the filter element, is held in a correct position on rotation of the filter element. In certain applications the filter element is pivotably journalled on the shaft 24 whereas in other applications the filter element is rigidly connected to the shaft 24 which in turn is movable in bearings 16a, 16b of the brackets. The latter embodiment is used at least when the center shaft constitutes the driving axle for the rotation of the filter element.

FIG. 2 shows an embodiment where the channel is supported by a base plate 61. The channel also rests against supporting plates 62. Separated material 44 is supplied via the ducts 56a, 56b (see also FIG. 4) to the tank 60.

FIG. 4 shows in detail the design of the center region of the filter element and how the collecting means 55a, 56b for separated material are connected therein with ducts 56a, 56b leading to the tank 60 for separated material. In the central region, below the pressure rollers 30a, 30b, and as a rule directly below these on each side of the plate 27, draining and conducting means 57a, 57b are provided which in the embodiment shown terminate in a circumferential drip edge 59a, 59b. The draining and conducting means are connected to opposite sides 29a, 29b of the plate 7 and have a central cavity 66a, 66b which is enclosed by the drip edge, and through which passes the center shaft 24. At the side of the center shaft 24 the collecting means 55a, 55b partly project into the respective cavity and they too are enclosed by the drip edge 59a, 59b. In the outer boundary surface of the draining and conducting means, grooves 58a, 58b are provided which extend from the opposite sides 29a, 29b of the plate 27 to the drip edge 59a, 59b. In certain embodiments, however, draining and conducting means 57a, 57b are omitted. The collecting means 55a, 55b are then provided with their openings 67a, 67b below the bottom end of the pressure rollers 30a, 30b. The openings as a rule are situated directly below the pressure rollers 30a, 30b and as a rule connect mainly to the plate 27. The openings of the parts facing away from the plate usually are situated farther away from the plate than the boundary surfaces 22a, 22b of the filter element.

Figure 5:
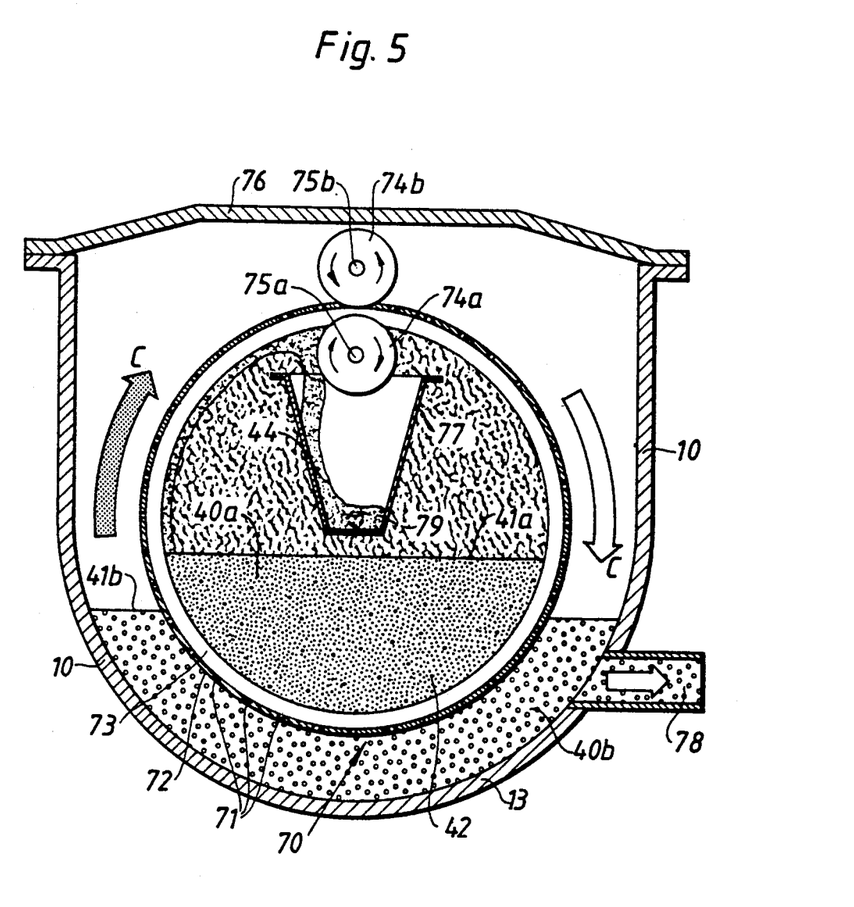

In the embodiment shown in FIG. 5, the filter element 70 is designed as a drum which is rotatable about a center shaft 79. The drum has an outer, mechanically substantially stable support 72 for a layer 73 of filter material arranged inside the drum. The support 72, correspondingly to what has been indicated for the mechanically stable plate 27, is provided with passages 71 corresponding to the passages 28 in the plate 27 described earlier. The filter material has a structure and a composition corresponding to what has been indicated earlier for the filter material of the filter element 20.

Two pressure means, shown in FIG. 5 as pressure cylinders 74a, 74b are provided on opposite sides of the drum constituting the filter element 70, i.e. one pressure cylinder 74a is situated inside the drum and the other pressure cylinder 74b outside the drum. The pressure cylinders are rotatable about center shafts 75a, 75b and are oriented substantially parallel with the boundary surfaces facing inwards and outwards respectively of the filter element. The inner pressure cylinder 74a is in contact with the layer of filter material 73 compressing the same, whereas the outer pressure cylinder 74b is in contact with the outside of the support 72 so as to stabilize the drum mechanically. Below the inner pressure cylinder 74a there is provided a collecting container 77 for seperated material. The channel is provided with a roof 76. An outlet duct 78 for purified liquid is arranged in the bottom region 13 of the channel.

In FIG. 5, numeral 40a refers to the incoming liquid containing contaminations 42, the incoming liquid being situated inside the drum and purified liquid 40b being present in the channel outside the drum.

In the region adjoining the end walls of the drum at least one bottom part of the interior of the drum is separated so as to form a liquid-tight seal from the space outside the drum. It will be obvious to those versed in the art that such a seal-forming separation is obtained, for example, by means of end pieces arranged mainly vertically which are provided with grooves into which the filter drum engages during its rotation. To obtain a sealing joint between the drum and the end walls, corresponding to what has been described for the filter element 20, the drum for example, may be provided at its opposite edge regions with outer parts lacking filter material, so that these outer parts during sealing passage through the grooves in the end pieces should prevent contaminated liquid from passing to the region outside the drum. As a rule the end piece portion is allowed to end a little above the region of the center shaft 79 of the drum. In certain applications the drum is provided only with one outer layer of filter material, whereas in other applications the drum has an inner as well as an outer layer of filter material. It has been stated above that the contaminated liquid is supplied to the interior of the drum, and that the purified liquid is withdrawn from the channel in a region outside the drum. It will be obvious to those versed in the art, that in certain applications the contaminated liquid will be supplied to the channel outside the drum and be purified by passing through the filter material into the interior of the drum and removed from there.

On using the device in accordance with the invention, e.g. in a plant for the purification of process water or sewage, the contaminated liquid 40a in the embodiment shown in FIGS. 1–4 is supplied to the channel 10 and, in the embodiment shown in FIG. 5, to the inner space of the drum 70 and thereafter passes through the filter element 20 and 70 respectively. In the course of this the liquid passes through the filter material 26a or 73 respectively of the filter element situated upstream, the passages 28 of the plate 27 or the passages 71 of the support layer 72 and through the filter material 26b situated downstream, if present, whereafter the liquid continues through the channel downstream of the filter element 20 or 70 respectively. Owing to the obstacle which the filter element and bodies already accumulated, if any, constitute for the passage of the liquid, a level difference is created between the liquid surface 41a upstream of the filter element and the liquid surface 41b downstream of the same. As the liquid passes through the filter material substances accompanying the liquid stick to the filter material and accumulate in the pores of the filter material. In embodiments where the filter element is rotated intermittently the accumulation of substances gradually will become so great that the combined counterflow area of the filter element becomes insufficient and the liquid surface upstream of the filter element commences to rise. When this occurs the filter element is rotated a distance so that filter material wherein contaminations have accumulated will be lifted up out of the liquid, at the same time as filter material with a better flow-through capacity is passed down into the liquid.

As the filter element is rotated, filter material 26a, 26b and 73 respectively passes and is compressed in the gap between the pressure rollers 30a, 30b or the pressure cylinders 74a, 74b respectively, see also FIG. 4. In so doing liquid present in the cavities of the filter material is squeezed out, along with substances in the pores of the filter material which are forced out of the filter material by the liquid. Such separated substances or such material 44 flow or fall down towards the outer boundary surface of the draining and conducting means 57a, 57b and are carried in the grooves 58a, 58b to the drip edges 59a, 59b, to fall into the collecting means 55a, 55b and be removed via the ducts 56a, 56b to the tank 60. In embodiments where the draining and conducting means 57a, 57b are absent, the contaminations, together with squeezed out liquid, fall directly into the collecting means 55a, 55b. Correspondingly, in the embodiment shown in FIG. 5, the material 44 and the liquid drop directly into the collecting container 77. Owing to the liquid being squeezed out of the filter material under pressure the material which adhered in the pores of the filter material is subjected to a corresponding pressure and is squeezed out of the filter material. The filter material cleaned in this manner is suitable thereafter to be passed down once again into the liquid flow in order to intercept substances accompanying the same.

It has been stated above that the filter element is rotated intermittently, but it will be obvious to those versed in the art that in certain applications a continuous rotation is preferable. This is especially the case when strongly contaminated liquid is to be purified. The invention reveals a very simple technique for intermittent rotation as well as for a controlled transition between intermittent and continuous rotation of the filter element. In accordance with this technique the level difference between the liquid surface 41a upstream and the liquid level 41b downstream of the filter element is measured.

When the level difference exceeds a predetermined value, rotation of the filter element is started, and when the level difference has fallen below a certain value, rotation is interrupted. In certain applications the speed of rotation is adapted according to the level difference, so that as the level difference increases, the speed of rotation too is increased, and as the level difference diminishes, the speed of rotation is lowered. A time control is supplied as a rule where the liquid flow and- /or the degree of contamination are such that parts of the filter remain outside the liquid flow for such a long time that otherwise there might be a risk of drying out of the filter material.

Within the concept of the invention a great number of embodiments are included. Thus in certain embodiments the filter element is rotated by pressure rollers 30a, 30b or 74, 75 respectively, which for this purpose are connected to driving means (not shown in the figures).

In some embodiments the plate 27 is absent whilst in other embodiments the plate is provided with filter material only on one side.

In certain applications of the invention a number of filter elements are provided behind one another in the direction of flow of the liquid so as to improve successively the purity of the liquid. In a preferred embodiment the filter elements are provided on a common center shaft. In certain applications the filter elements are coupled in parallel so as to increase the capacity (flow area), whilst in other applications they are coupled in series so as to increase the degree of purification. In the latter case the filter material as a rule will have an ever diminishing pore size the farther downstream the filter is situated.

It also will be obvious to those versed in the art that the concept of the invention is not limited to embodiments incorporating one or more rotating filter elements as described above. Corresponding technical effects are achieved e.g. with a filter element which is moved across the channel 10 and where the filter material is compressed after it has passed through an opening in the channel wall. In such an application, for example, two regions of the filter element alternate between positions in the liquid flow and positions outside the same.

The foregoing detailed description made reference only to a limited number of embodiments of the invention, but it will be readily obvious to those versed in the art that the invention embraces a great number of embodiments within the scope of the appended claims.

What is claimed is:

1. A method of separating contaminating substances from a liquid comprising providing a flow of liquid containing contaminating substances to be separated therefrom, passing the flow of liquid through a first portion of a displaceable filter comprising resilient porous, filter material while a second portion of the filter is outside the flow of liquid, separating contaminating substances from said flow of liquid in said first portion of the filter to obtain purified liquid after the flow of said liquid through the first portion of the filter, displacing said filter so that said first portion thereof is removed from the flow of liquid and said second portion is introduced into the flow of liquid, compressing said first portion of said filter when said first portion is removed from the flow of liquid by applying pressure from each of opposing rollers to squeeze out liquid retained in the filter together with contaminating substances separated in said filter, returning said first portion of said filter to a position in which the flow of liquid again passes therethrough while the second portion of the filter is again out of said flow of liquid and said returning of the portions of the filter outside the flow of liquid back into the flow of liquid being before said respective portions dry out.

2. A method as claimed in claim 1 wherein said displacing of said filter is effected by rotating said filter from a position in which the flow of liquid passes through said first portion to a position in which said first portion is removed from the flow of liquid whereupon said first portion is compressed and then the filter is rotated to bring said first portion back into the flow of liquid.

3. A method as claimed in claim 1 wherein the liquid and separated contaminating substances squeezed out when the filter is rotated and the portion thereof outside the flow of liquid is compressed are collected and conveying said collected liquid and separated contaminating substance to a separation tank.

4. A method as claimed in claim 3 comprising effecting said collecting of said liquid and separated contaminating substance within said filter, said conveying of said liquid and separated contaminating substances being effected to convey the liquid and separated contaminating substances away from said filter to said separation tank.

5. A method as claimed in claim 3 wherein said collecting of said liquid and separated contaminating substances are effected by positioning a collecting member having an open inlet beneath said rollers so that the liquid and separated contaminating substances are deposited into the collecting member.

6. A method as claimed in claim 1 wherein the flow of liquid forms two levels on opposite sides of the filter whose difference is related to the amount of contaminating substance on the filter which has been separated from the flow of liquid, said method further comprising initiating said displacing of the filter when the difference in levels of the flow of liquid reaches a predetermined value.

7. A method as claimed in claim 1 comprising positioning the filter in a channel through which the flow of liquid takes place and sealing the filter in the channel so that the flow of liquid is constrained to pass through the filter.

8. Apparatus for separating contaminating substances from a liquid to obtain a purified liquid comprising means providing a flow of liquid containing contaminating substances to be separated from the liquid, filter means positioned in the flow of liquid and including a resilient porous, filter member, in which contaminating substances from said liquid are separated, means for rotating said filter member so that the flow of liquid passes through a first portion of the filter member while a second portion of the filter member is outside the flow of liquid means for displacing said filter member so that, whereafter said first portion is outside the flow of liquid and said second portion is in said flow of liquid, means for compressing said first portion of said filter member when the latter is outside the flow of liquid by applying pressure from each of opposing rollers to squeeze out liquid retained in said first portion of the filter member together with separated contaminating substance, means for collecting purified liquid after the flow of liquid has passed through the filter means, a channel arranged for containing the flow of liquid, and means for sealing said filter member in said channel so that the flow of liquid is constrained to pass through whichever of said portion of the filter member is in said channel, said filter member comprising a disc rotatable about a central axis, said disc having a peripheral portion extending outside said channel.

9. Apparatus as claimed in claim 8 comprising collecting means disposed beneath said rollers so that squeezed liquid and separated contaminating substances will fall into said collecting means, and conveying means for receiving the liquid and separated contaminating substances from the collecting means to convey the same away from the filter member.

10. Apparatus as claimed in claim 3 comprising draining and conducting means disposed in a central region of said filter member and defining a cavity into which said collecting means extends such that the squeezed liquid is guided downwardly by the draining and conducting means to the collecting means.

11. Apparatus as claimed in claim 8 wherein said filter means further comprises a rigid support member having aperture means for the flow of liquid therethrough, said filter member being fixed on said support member.

12. Apparatus as claimed in claim 8 wherein said filter means has a periphery including means for draining said filter member while permitting the filter member to be rotated.

13. A method of separating contaminating substances from a liquid comprising providing a flow of liquid containing contaminating substances which are to be separated from the liquid, passing the flow of liquid through a lower portion of a rotatable, filter of resilient, porous, filter material while an upper portion of the filter is outside the flow of liquid, separating contaminating substances from said flow of liquid in said lower portion of the filter to obtain purified liquid after said liquid flows through said lower portion of the filter, rotating said filter so that said lower portion thereof is removed from the flow of liquid and said upper portion is introduced into the flow of liquid, the filter being rotated about an axis extending in the direction of liquid flow so that the liquid enters the filter at one side surface thereof and exits at an opposite side surface thereof, compressing said lower portion of said filter when said lower portion is removed from the flow of liquid by applying pressure from each of the opposite side surfaces of said lower portion to squeeze out liquid retained in the filter together with contaminating substances separated in said filter, and returning said lower portion of said filter to a position in which the flow of liquid again passes therethrough while the upper portion of the filter is again out of said flow of liquid, said pressure being applied to the opposite side surfaces of the filter by rotating at least one roller in pressure contact with at least one corresponding side surface of the filter at least one of said at least one roller being formed as a frustoconical roller extending radially of the filter and whose diameter increases radially outwards of said filter, the at least one frustoconical roller being rotated at an angular velocity so that the peripheral speed of the at least one latter roller is substantially equal to that of the rotating of the filter.

14. A method as claimed in claim 13 wherein said pressure is applied to the opposite side surfaces of the filter by rotating the filter between two frustoconical rollers in pressure contact with the side surfaces of the filter.

15. Apparatus for separating contaminating substances from a liquid to obtain a purified liquid comprising means providing a flow of liquid containing contaminating substances to be separated from the liquid, filter means positioned in the flow of liquid and including a resilient porous, filter member in which contaminating substances from said liquid are separated, said filter member being of cylindrical disc-shape and being rotatable about an axis extending in the direction of flow of the liquid so that the liquid enters one side surface of the filter member and exits from the opposite side surface of the filter member, means for rotating said filter member so that the flow of liquid passes through a lower portion of the filter member while an upper portion of the filter member is outside the flow of liquid, means for compressing said upper portion of said filter member by applying pressure to said side surfaces of the filter member to squeeze out liquid retained in said filter member together with separated contaminating substance, said means for compressing said upper portion of said filter member comprising at least one radial roller in pressure contact with a corresponding side surface of said filter member and means for collecting purified liquid after the flow of liquid has passed through the filter means, said at least one radial roller comprising at least one frustoconical roller which has an increasing diameter in a direction radially outwards of said filter member, said apparatus further comprising means for rotating said at least one frustoconical roller about its axis at a velocity so that the peripheral speed of the at least one frustoconical roller is substantially equal to that of the rotating filter member.

16. Apparatus for separating contaminating substances from a liquid to obtain a purified liquid comprising means providing a flow of liquid containing contaminating substances to be separated from the liquid, filter means positioned in the flow of liquid and including a resilient porous, filter member, in which contaminating substances from said liquid are separated, means for rotating said filter member so that the flow of liquid passes through a first portion of the filter member while a second portion of the filter member is outside the flow of liquid, whereafter said first portion is outside the flow of liquid and said second portion is in said flow of liquid, means for compressing said first portion of said filter member when the latter is outside the flow of liquid by applying pressure from each of opposing rollers to squeeze out liquid retained in said first portion of the filter member together with separated contaminating substance, means for collecting purified liquid after the flow of liquid has passed through the filter means, a channel arranged for containing the flow of liquid, means for sealing said filter member in said channel so that the flow of liquid is constrained to pass through whichever of said portion of the filter member is in said channel, said filter member comprising a drum rotatable about a central axis, said drum having a peripheral portion extending outside said channel.

* * * * *